United States Patent [19]

Barozzi

[11] Patent Number: 4,946,428

[45] Date of Patent: Aug. 7, 1990

[54] COMPACT PLAY-FREE SPEED-REDUCING TRANSMISSION

[76] Inventor: Gian P. Barozzi, Via Desti 7, Crema (Cremona), Italy

[21] Appl. No.: 122,095

[22] Filed: Nov. 18, 1987

[30] Foreign Application Priority Data

Nov. 18, 1986 [IT] Italy .................... 22376 A/86

[51] Int. Cl.⁵ .............................................. F16H 1/28
[52] U.S. Cl. ............................ 475/164; 475/176; 475/180
[58] Field of Search ............. 74/800, 804, 409, 801, 74/410, 462; 403/320, 362

[56] References Cited

U.S. PATENT DOCUMENTS

| | | | |
|---|---|---|---|
| 1,582,075 | 4/1926 | Page ............................ | 74/800 |
| 1,611,981 | 12/1926 | Amberg ...................... | 74/800 |
| 2,148,564 | 2/1939 | Kuhns ......................... | 74/410 |
| 2,235,501 | 3/1941 | Kuhns ......................... | 74/410 |
| 2,699,690 | 1/1955 | Kobler ........................ | 74/800 |
| 2,734,396 | 2/1956 | Falk et al. ................. | 74/410 X |
| 3,258,995 | 7/1966 | Bennett et al. ........... | 74/801 |
| 3,385,135 | 5/1968 | Strandberg ................ | 74/804 X |
| 3,661,023 | 5/1972 | Maurey ...................... | 403/320 X |
| 4,094,330 | 6/1978 | Jong ........................... | 403/362 X |
| 4,436,468 | 3/1984 | Ozaki et al. ............... | 403/362 X |
| 4,469,376 | 9/1984 | Pelz ............................ | 74/804 X |
| 4,550,630 | 11/1985 | Remus ....................... | 74/800 |
| 4,679,465 | 7/1987 | Goto et al. ................ | 74/804 |
| 4,702,126 | 10/1987 | Nakamura ................. | 74/800 |
| 4,708,290 | 11/1987 | Osmond ..................... | 74/800 |
| 4,709,590 | 12/1987 | Richards .................... | 74/410 X |

FOREIGN PATENT DOCUMENTS

| | | | |
|---|---|---|---|
| 139327 | 11/1950 | Australia .................... | 74/800 |
| 2619838 | 11/1977 | Fed. Rep. of Germany | 74/800 |
| 0057546 | 4/1983 | Japan ......................... | 74/800 |

*Primary Examiner*—Dwight Diehl
*Attorney, Agent, or Firm*—Herbert Dubno; Andrew Wilford

[57] ABSTRACT

The compact high-ratio speed reducer without play consists of an external housing in which a first shaft is rotatingly arranged, carrying a planetary element on which a first gear is loosely supported, this gear having two toothings, one of which is in engagement with a crown wheel integral with the external housing and coaxial with the first shaft, and the second is in engagement with a further gear, integral with a second shaft supported within the external housing and coaxial with the first shaft. The gear toothings are urged together to eliminate possible play between the toothings in mutual engagement.

6 Claims, 3 Drawing Sheets

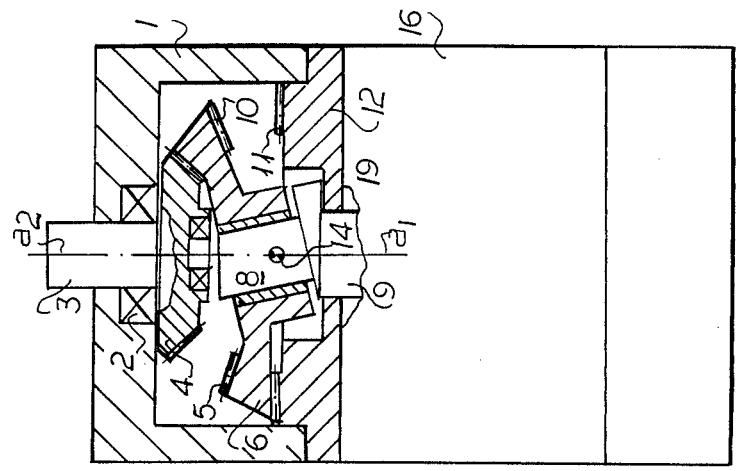
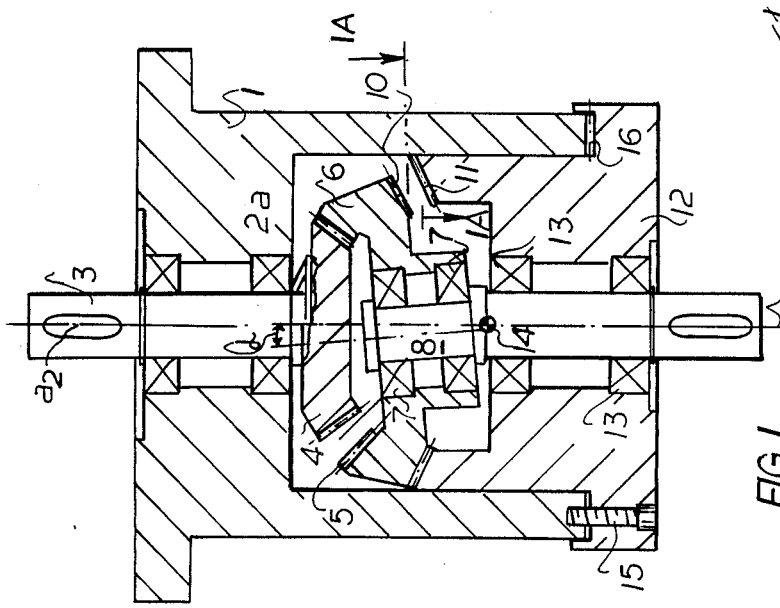
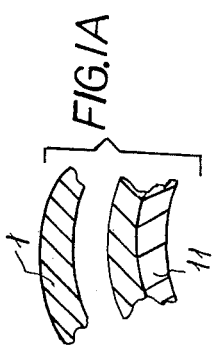
FIG.1
FIG.2
FIG.1A

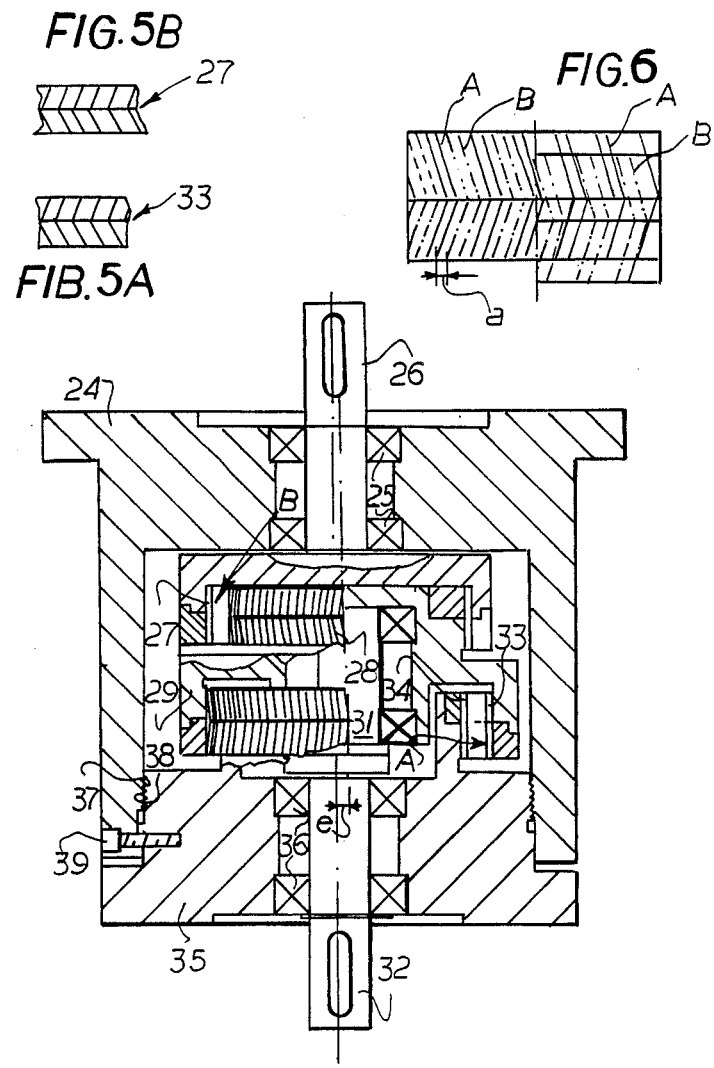

4,946,428

COMPACT PLAY-FREE SPEED-REDUCING TRANSMISSION

FIELD OF THE INVENTION

The present invention relates to a compact playless high-ratio reduction unit, particularly for automatic manipulators and the like.

BACKGROUND OF THE INVENTION

In many appliications, in the field of precision mechanics, particularly in the field of automation, it is necessary to actuate mechanical components at a low speed and with high-precision movements.

It is particularly necessary, for instance in the field of automatic manipulators, "robots ", to carry out low movements of the parts, controlling accurately the positions reached and insuring a high repeatability of the motions to ensure that it is possible to come back to a certain position by reversal of the motion previously executed.

In order to perform such motions or actuations, electric motors are commonly used, such motors are coupled with reduction units in order to obtain the required speed of motion.

Such reducing units have to meet a number of requirements, in order to accommodate such applications. Among these requirements are reduced space occepancy, limited internal friction, high reduction ratio, and absence of play. In order to achieve reduced friction, it is necessary to limit the number of gears used, while the high reduction ratio requires several reduction steps and therefore the use of many gears.

It is presently possible to satisfy such requirements by using an epicyclic speed reducer, but reducers of this kind are of a complex structure and in any case do not allow for the desired absence of play in the transmission.

In fact, in a transmission consisting of a couple of gears, it is generally the situation that the torque is transmitted with rotation in one direction from one gear to the other, and the driving teeth of one gear each have one flank in contact with the corresponding flank of teeth of the other gear, while the opposite flank of the first tooth will be spaced by a certain value from the corresponding flank of the teeth of the other gear. This distance is due to the limited precision of the gear cutting, of the center to center distance between gears, and like parameters which create play which generally cannot be completely eliminated, particularly in industrial production without adding unacceptable cost.

This distance between corresponding flanks of opposite teeth in engagement is very small, but its existence leads to the fact that, when the rotational motion is reversed, before the new flanks transmitting the torque are in contact, there is a short stretch of free rotation (backlash) prevents a very accurate correspondence between the driving and driven gears. In a reducing unit, having several pairs of gears in mutual engagement, this phenomenon is amplified, and, as already mentioned, can be eliminated only through high precision in the manufacture of the gears and of their support members.

In an automatic manipulator, where the control of the position of the moving parts can be achieved by computing the rotations of the respective drive motors, the presence of play in the reducers for which high speed-reducing ratios are required, is particularly serious, since it can endanger the precision and require various and more complex methods of position control.

OBJECT OF THE INVENTION

It is, therfore, an object of the invention to provide a reduction unit with an especially compact structure, affording a very high ratio of speed reduction with a limited number of gears, and above all, without mechanically play.

SUMMARY OF THE INVENTION

This object is obtained according to the present invention, which provides a compact reduction unit without play, with a high reduction ratio, particularly for automatic manipulators, consisting of an external housing wherein a first shaft is rotatably supported, carrying a planetary element on which a first gear is loosely supported. This gear has two toothings, one of which meshes with a crown wheel integral with the external housing and coaxial with the first shaft, and the other meshing with a second gear integral to a second shaft supported within the external housing and coaxial with the first shaft. Biasing means is provided in connection with the toothings of the gear, to elimination possible play between the toothings is mutual engagement.

More particularly, in accordance with one of the embodiments, the compact reduction unti according to the invention consists of an external housing, wherein a first shaft is rotatable, having one inclined end portion, on which a first gear is loosely supported which has two conical (bevel) toothings with a common apex and positioned on the axis of the first shaft, coinciding with the intersection thereof with the axis of the inclined portion, one of these toothings being in engagement with a bevel crown wheel integral to the external housing and coaxial with the first shaft, and the other in engagement with a second bevel gear, integral with the second shaft supported within the external housing and coaxial with the first shaft.

According to a preferred embodiment, the bevel crown wheel integral to the external housing is conveniently positioned on the same side of the second shaft carrying the second bevel gear and meshes with the first gear having two conical toothings on the same side of the second gear with respect to its axis of rotation, thus reducing considerably the inaccuracy due to the oscillations or vibrations of the supports.

Alternatively the reduction unti can consist of an external housing wherein a first shaft is rotatably supported, having an accentric end portion, on which a first gear is loosely supported. The first gear has two cylindrical toothings, one internal the other external, one of which is in engagement with a crown wheel with internal or external toothing, integral to the external housing and coaxial with the first shaft and the other is in engagement with a second gear, with external or internal cylindrical toothing, integral with a second shaft supported within the external housing and coaxial with the first shaft.

The toothing of the gears and the crown wheels can be cylindrical toothings with straight teeth, if a large number of meshing teeth allows the desired elemination of the play, or can be helicoidal toothings and each of them consists of two contiguous portions, having opposite evolving directions of the helix.

In the case of conical or helicoidal toothing, the external housing is conveniently made of two parts separated in a transverse direction with respect to the axis of the first and second shafts, with axially adjustable positions with respect to each other, and each supporting one of the two shafts, axially confined thereto, in order to accommodate the mutual locking of the meshing gear pair.

For this purpose, in a convenient embodiment, the two portions of the external housing are connected to one another by a threading in mutual engagement, whose relative screwing determins the mutual axial movement of the two sections of the external housing, means for blocking the rotation causing the mutual screwing of the two sections of the housing being provided.

An elastic element can also be positioned between the second gear integral with the second shaft and its supports within the housing of the reduction unit, capable of being preloaded to close the two sections of the external housing and capable to exert an axial thrust upon the gears of the reducer in mutual engagement, which is greater than the axial thrust caused by toothings of the same gears at the transmitted torque. Alternately the sections of the housing can be provided with elastic biasing means for urging the parts together. This biasing means can be preset as to biasing force and urges the gears axially together with a force greater than the axial thrust that urges them apart during normal operation.

In order to obtain a high reduction ratio one of the gears of the meshing gears has a number of teeth that varies very slightly from the number of teeth of the other gear.

DESCRIPTION OF THE DRAWING

The above and other objects, features, and advantages will become more readily apparent from the following, reference being made to the accompanying drawing in which:

FIG. 1 is an axial section through a speed-reducing transmission according to this invention;

FIG. 1A is a large-scale view of the detail indicated at line 1A—1A in FIG. 1;

FIG. 2 is an axial section through the transmission of FIG. 1 mounted on a motor.

FIG. 5 is an axial section through a variant on the embodiment of FIG. 4;

FIGS. 5A and 5B are views taken in the direction of arrows A and B of FIG. 5 showing heliciodal toothings with double heliciodal teeth; and FIG. 6 is a diagram showing how the teeth of FIG. 5 mesh.

SPECIFIC DESCRIPTION

Figure 4:
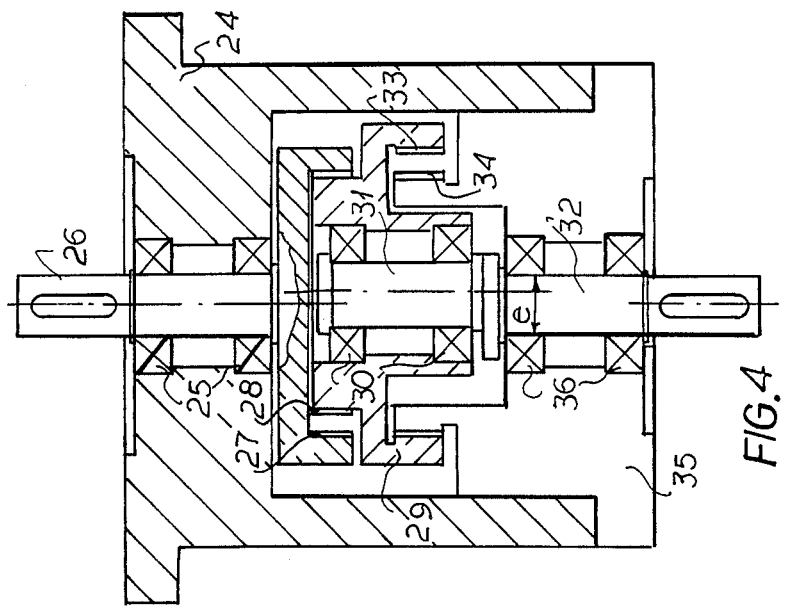
FIGS. 3 and 4 are axial sections through further transmissions according to this invention.

As shown in FIG. 1 the speed-reducing transmission according to the invention has an external housing having a part or section 1 in which a shaft 3 is supported via bearings 2, the shaft carrying at one end a bevelled gear 4. The gear 4 mates with the toothing 5 of a second gear 6 loosely supported by bearings 7 on an inclined portion 8 of a shaft 9. The gear 6 has in addition a second toothing 10, through which in turn it meshes with the crown wheel 11, integral with the section 12 of the external housing within which the shaft 9 is supported by bearings 13, with its axis $a_1$ coinciding with the axis $a_2$ of the shaft 3.

The gearing group consisting of gear 4, gear 6 with its toothings 5, 10 and the crown wheel 11 constitutes a spur gear train of the epicyclic type in which the portion 8 of the shaft 9 has the function of a train carrier.

In fact an orbiting of the shaft 9 causes the rotation of its portion 8 around the center 14, a point where the axis $a_3$ of the inclined portion 8 meets axis $a_1$.

The rotation of the portion 8 causes the gear 6 to revolve on the crown wheel 11, at each rotation performing in addition a fraction of a rotation around the axis $a_3$; this rotation is in turn transmitted to the gear 4 and to the shaft 3.

The correct mutual meshing of the toothings is insured by the coincidence at the center 14 of the apexes of the pitch profile of all conical toothings and by its coincidencce with the inersection point of the axes $a_3$ and $a_1$.

The reduction ratio accomplished by the reduction unit can be particularly high, since the number of teeth of the gear 4 and of the toothing 5, and of the toothing 10 and the crown 11 can be selected to be sufficiently close, providing for this puspose an angle $\alpha$ for the inclination of the axis $a_3$ of the inclined portion 8 with respect to the axis $a_1$ of the shaft 9 of a very low value. In this way it is possible to reach reduction ratios of over 1/50, using a reduced number of gears. In addition, the described structure permits the use of a very large number of teeth in contact for all the toothings, achieving a particularly regular functioning and allowing the selection of a very small pitch for the toothings and the application of only a small fraction of stress of each tooth.

A further and basic advantage results from the possibility to eliminate the play existing between the various toothings; in fact, for this purpose it is sufficient to lock to each other the sections 1 and 12 of the external housing in order to bring the toothings into no-play contact and then to block the assembly in the reached position, via screws 15.

As shown in FIG. 1, in order to accomplish such a dimensional adjustment in assembling stages, ring washers 16 can be provided, which can be added or eliminated at the moment of closure of the two section 1, 12 of the external housing, in order to reach the desired meshing of the toothings. This has proved to be of great importance for many precision uses; such as for instance for automatic manipulators or "robots", in which it is required to monitor the position of the moving parts, actuated from motors equipped with speed reduces, with great precision unequivocally even in the case of rotation in two directions of the actuating motors.

Such controls are conveniently made with measuring devices for the rotation of the motors and therefore could totally lose their precision, if for instance at the moment of the motion reversal of the motor, the latter would be coupled with a reducer having free space or play between the corresponding flanks of teeth opposite to the ones in engagement, since in such cases the reversal is followed by a short free rotation of one gear with respect to the mating gear (i.e. blacklash introducing an error in the performed measurement.

In FIG. 2, the reduction unit of FIG. 1 is shown to be directly coupled with the motor 16 and wherein the shaft 9 is the motor shaft.

In this embodiment, the shaft 9 has a final portion 17, positioned beyond the inclined portion 8, which is supported within a bearing 18 lodged in the gear 4, achieving this way an adequate rigidity of the assembly, yet maintaining considerable compactness.

For the purpose of counterbalancing the mass of gear 6 and of the inclined portion 8 of the shaft 9, an eccentric compensation mass 19 is provided, capable of insuring a rotation without vibration.

Figure 3:
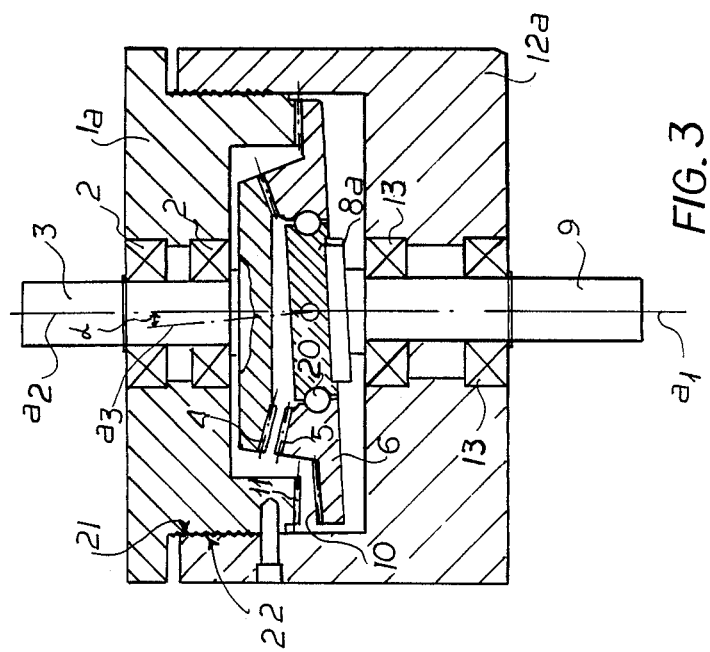

In order to achieve an even more compact structure, while reducing strain on the supports of the gear 6, the solution illustrated in FIG. 3 is convenient. The crown 11 is provided in the section 1a of the external housing, rather than in the section 12a and is thus located on the same side as the gear 4. The eccentric portion 8a of the shaft 9 is provided with a large diameter, in order to offer a correspondingly large arm and to reduce proportionally the forces acting upon support members of the gear 6, which can therefore consist only of one bearing 20.

The embodiment represented in FIG. 3 shows how an angle α of small value could lead to diameters of the toothings in relative engagement, and therefore to a very small difference in the number of the teeth, to achieve a particularly high reduction ratio. In addition the close arrangment of the meshing positions of the gears 4 and 6 results in a considerable reduction of the irregularities due to the oscillation and vibration of the supports.

In order to achieve the elimination of play between the toothings in engagement, in FIG. 3 a screw thread 21 is provided on the section 1a, in engagement with a corresponding thread 22 on the section 12a, with these threads, the two sections can be drawn together by screwing, until the toothings have made a complete contact, and they can be further locked by applying to the same toothings a certain axial load.

For this puspose it is also possible to provide for the interposition of an elastic element, such as a cup spring 2a, positioned between the bearing 3 and the gear 4, as shown in the right side of the FIG. 1, whose deformation stress must be higher than the axial thrust from the conical gears at the operational torque of the reduction unit.

When the desired relative position of the two sections of the external housing is reached, these can be blocked with a screw 23, screwed in a threaded bore in the body 1a, after the locking of the two sections of the housing, or with a pin or similar means for arresting the rotation.

Such operations for the elimination of play can be carried out during assembly with the new reducer, or at successive moments in the case when, after a certain period of use, the gears have been subjected to wear impairing the precision.

In the case when the gears have been mutually locked by applying a load, the possible wear can be compensated automatically by the elastic recovery of the members deformed by such a load, such as the spring 2a.

Instead of the spring 2a, in order to automatically compensate the play resulting from the wear of the toothings, it is also possible to provide elastic elements acting between the two sections of the external housing, and which bias them together in an axial direction, imparting this way the desired axial load to the toothings in mutual engagement.

The embodiment wherein means for an axial preload of the gears are provided, can be convenient in the cases where the increase of the internal friction as a result of the preload is not undesirable. In those cases where a reducer with minimum friction is desired, which is made possible as a result of the limited number of used gears, deformable elements are not present in the reduction unit and the elimination of play is performed by bringing together the sections of the external housing only up to the contact position of the teeth.

The reduction unit according to the invention can also be made with cylindrical toothings, as shown in FIG. 4.

There is in fact a section 24 of the external housing, wherein a shaft 26 is supported by bearings 25, the shaft being equipped at its extremity with the gear with inner toothing 27. This gear meshes with the outer toothing 28 of a gear 29, supported in free rotation by bearings 30 and on the eccentric portion 31 of a shaft 32, coaxial with the shaft 26. The gear 29 has also an inner toothing 33, through which it meshes in turn with the outer toothing 34 coaxial with the shaft 32 and integral to the section 35 of the external housing, wherein the shaft 32 is supported by bearings 36.

In this embodiment, it is the eccentrically "e" existing between the shaft 32 and its eccentric portion 31 which determines jointly with their pitch diameter, the number of teeth of the toothing in mutual engagement, and as a result, the reduction ratio achieved by the system.

This embodiment is particularly advantageous from the economic point of view, given the ease of manufacturing cylindrical toothings in comparision with conical toothings; it is especially advantageous in the cases where the precision afforded by a great number of teeth in mutual engagement, some in an inner toothing and others in an outer toothing, is sufficient to eliminate the play of the shaft at the output of the reducer.

Nevertherless, in cases when the obtained precision is not yet sufficient for the purpose of accommodating an adjustment for the elimination of play even in the case of straight toothings, it is possible as shown in FIG. 5, to made each toothing in two portions with helicoidal toothing with reversed directions. In this case an axial locking of the external housing of the reduction unit, for instancce carried out by threads 37, 38 blacked via screw 39, determines a slight axial shifting between the relative positions of the mating helicoidal toothings, bringing into contact opposite flanks of each pair of helicoidal toothings with the opposite toothings mating therewith, in order to completely eliminate the existing play.

Such a shifting is schematically illustrated in FIG. 6, wherein a toothing A is shown, consisting of two opposite helicodial portions, represented in solid lines, meshed with a toothing B, also consisting of two opposite helicoidal portions and represented in dotted lines in the figure; in the left side of the figure the toothings are represented aligned and with a high play "G" between them, while in the right side of the figure it is shown how, following the axial displacement of the toothing B, the play has been eliminated.

Under such conditions, for each direction of rotation, only one portion of the gear is meshed for the transmission of the torque, and has to be dimensioned for such conditions.

Even in this embodiment a preloadable elastic element can be introduced, such as the spring 2a of FIG. 1, in order to automatically make possible the compensation of play due to the wear of the toothing.

In the case of cylindrical toothings, these can be made according to a different design than the one shown, for instance making the crown wheel 34 with inner toothing and the toothing 33 external, and, at the same time the toothing 28 internal and the gear 27 with an inner toothing, thereby achieving a rotational train, equivalent to the one shown.

Multiple further variants can be introduced, without leaving the framework of the invention and its general characteristics.

I claim:

1. A compact high-ratio speed reducer without play, in particular, for an automatic manipulartor, comprising:

an external housing having a first part and a second part, said first and second parts having respective first and second axes and being coaxial with each other;

a driving shaft rotatably mounted in one of said part's a driven shaft rotatably mounted in the other of said parts, said shafts extending axially opposite each other beyond the respective parts, said driving and driven shafts being rotatable about said first and second axes;

a first transmission gear on said driving shaft formed with a pair of toothings in said external housing;

another gear rigidly connected with said driven shaft in said external housing facing said first gear;

a crown wheel formed on said housing coaxial with said driving shaft, said toothings of said gears and of said crown wheel being helicoidal toothings, each of said helicoidal toothings including two contiguous portions having oppositely evolving directions of respective helix. so that one of said toothings of said first gear is in an engagement with said crown wheel of said external housing and the other of said pair of toothings of said first gear meshes with said another gear transmitting a torque thereto;

means for mutual axial adjustment of said first and second parts of said external housing for eliminating a play of said toothings upon the engagement thereof, and at least one registering element extending transversely perpendicular to the axess of rotation of said shafts through at least one of said first and second parts of said external housing and cooperating with said means for mutual axial adjustment, so that said registering element arrests the mutual axial adjustment of said first and second part of the housing upon the elimination of the play of said toothings.

2. The compact high-ratio speed reducer defined in claim 1 wherein said driving shaft is formed with an inclined portion, said first gear being rotatably mounted on said inclined portion of said driving shaft.

3. The compact high-ratio speed reduceer defined in claim 1 wherein said means for mutual axial adjustment are screw threads provided on respective contacting surfaces of said parts of said external housing.

4. The compact high-ratio speed reducer defined in claim 1, further comprising elastic elements interposed between the other gear and the second part of said external housing.

5. The compact high-ratio speed reducer defined in claim 1 wherein numbers of teeth of said toothings of the respective gears differ by very small values 6. The compact high-ratio speed reducer defined in claim 1 wherein said first gear is a nutating gear.

* * * * *